(12) United States Patent
Bechtold

(10) Patent No.: US 8,607,749 B2
(45) Date of Patent: Dec. 17, 2013

(54) CAMSHAFT

(75) Inventor: Matthias Bechtold, Haslach (DE)

(73) Assignee: Neumayer Tekfor Holding GbmH, Hausach (DE)

( * ) Notice: Subject to any disclaimer, the term of this patent is extended or adjusted under 35 U.S.C. 154(b) by 0 days.

(21) Appl. No.: 13/480,056

(22) Filed: May 24, 2012

(65) Prior Publication Data

US 2012/0227689 A1 Sep. 13, 2012

Related U.S. Application Data

(63) Continuation of application No. PCT/DE2010/001245, filed on Oct. 22, 2010.

(30) Foreign Application Priority Data

Nov. 26, 2009 (DE) .......................... 10 2009 055 868

(51) Int. Cl.
*F01L 1/34* (2006.01)

(52) U.S. Cl.
USPC ..................... 123/90.15; 123/90.6; 123/90.39

(58) Field of Classification Search
USPC .......................... 123/90.15, 90.12, 90.6, 90.39
See application file for complete search history.

(56) References Cited

U.S. PATENT DOCUMENTS

| | | | |
|---|---|---|---|
| 5,359,970 A | 11/1994 | Krebs | |
| 5,979,386 A | 11/1999 | Swars | |
| 2007/0204819 A1 | 9/2007 | Elendt et al. | |
| 2008/0289593 A1 | 11/2008 | Manther et al. | |
| 2011/0180027 A1 | 7/2011 | Hartlieb et al. | |

FOREIGN PATENT DOCUMENTS

| | | |
|---|---|---|
| DE | 42 36 655 A1 | 5/1994 |
| DE | 196 06 732 A1 | 9/1996 |
| DE | 10 2004 033 800 A1 | 2/2006 |
| DE | 10 2008 007 255 A1 | 8/2008 |
| DE | 10 2007 027 979 A1 | 1/2009 |
| DE | 10 2008 024 875 A1 | 11/2009 |
| DE | 10 2008 024 876 A1 | 11/2009 |
| DE | 10 2008 028 513 A1 | 12/2009 |
| WO | WO 2006/012959 A1 | 2/2006 |

OTHER PUBLICATIONS

International Search Report with English translation dated Jun. 30, 2011 (four (4) pages).
German Search Report with partial English translation dated May 17, 2010 (five (5) pages).

*Primary Examiner* — Zelalem Eshete
(74) *Attorney, Agent, or Firm* — Crowell & Moring LLP

(57) ABSTRACT

A camshaft including a carrier element and a cam, in which the carrier element is composed of carrier segments arranged axially one behind the other along a longitudinal axis such that the carrier segments are axially displaceable relative to each other.

6 Claims, 2 Drawing Sheets

CAMSHAFT

CROSS REFERENCE TO RELATED APPLICATIONS

This application is a continuation of international patent application no. PCT/DE2010/001245, filed Oct. 22, 2010 designating the United States of America and published in German on Jun. 3, 2011 as WO 2011/063780, the entire disclosure of which is incorporated herein by reference. Priority is claimed based on Federal Republic of Germany patent application no. DE 10 2009 055 868.3, filed Nov. 26, 2009, the entire disclosure of which is likewise incorporated herein by reference.

BACKGROUND OF THE INVENTION

The invention relates to a camshaft having at least one carrier element and at least one cam.

A camshaft has at least one carrier element, also termed a tube or shaft, and at least one cam. When used in engines, camshafts serve as a part of the valve operating assembly, and the camshaft in this case rotates about its longitudinal axis. The cams convert the rotary movement into longitudinal motion, thereby controlling the intake and exhaust valves of the engine. In order to make it possible to provide better control according to the load on the engine, the prior art includes so-called camshaft adjusters which bring different cams into functional engagement with the valves, or which modify the settings of the cams with respect to each other, for example via the angles thereof.

SUMMARY OF THE INVENTION

The object of the present invention is to provide a camshaft which offers an alternative possibility to the prior art for the adjustment of the cams.

This and other objects have been achieved by the invention as described and claimed hereinafter.

In accordance with the invention, the carrier element and/or shaft comprises at least two components or shaft segments which are axially displaceable relative to each other along a longitudinal axis. The longitudinal axis refers particularly to the axis about which the camshaft rotates when in the installed position. In cases where there are more than two carrier segments, one embodiment includes a configuration in which at least the carrier segments which are axially displaceable relative to each other are arranged in a telescopic configuration axially one behind the other and are partially nested inside each other. By means of this axial displacement, cams can be moved in relation to the valves, and/or the valves can be brought into contact with differently configured cams.

The axial displacement itself is the result of a rolling action of rolling elements, which may, for example, be rollers or balls, and which are arranged, for example, between the inner and outer carrier segments which are partially inserted coaxially one inside the other. The rolling elements are thereby guided in guide grooves or races of the carrier segments. The guide grooves preferably extend axially parallel to the longitudinal axis. In addition, the configuration preferably includes multiple guide grooves which are each constructed and arranged symmetrically about the longitudinal axis. Furthermore, the same number of rolling elements are preferably situated in each of the guide grooves. The guide grooves of the carrier segments are thereby preferably associated with each other and form respective pairs.

In one embodiment, the configuration includes at least one ball cage, whereby the ball cage holds at least one rolling element. In a configuration having multiple rolling elements—particularly balls—the ball cage ensures, by way of example, adequate distance between rolling elements arranged, for example, one behind the other in a ball race. In addition, by means of the ball cage, rolling elements in different races can be held in the same plane.

In another embodiment, at least one of the at least two carrier segments has at least one limit stop on an inner side and/or on an outer side thereof. The limit stop in this case restricts the axial displacement path of at least one rolling element inside a guide groove or inside a pair of guide grooves. Thus, this limit stop is effectively a stop which, on the one hand, limits the relative axial displacement path of at least two carrier segments; and on the other hand, the limit stop optionally also prevents the rolling element or elements from falling out of the region between the two carrier segments. The limit stops in this case preferably extend substantially radially towards or away from the center, such that each limit stop projects into the track of the rolling elements. In this embodiment, the rolling elements are held in their tracks by the limit stops. This means that the guide grooves are preferably closed off at the two ends thereof, in the radial dimension, at least for the path of the rolling elements. A limit stop in this case can also be formed by a, for example, radially inwardly or outwardly extending segment of the wall. In an alternative or complementary embodiment, the limit stops are formed by, for example, rings which are held in grooves.

In a further embodiment, at least one of the at least two carrier segments is constructed with a substantially tubular shape. In one embodiment, at least one of the at least two carrier segments is at least partially hollow.

In yet another embodiment, the configuration includes at least one alternative cam, and the alternative cam is arranged on the carrier element. Thus, at least the first cam and the alternative cam are arranged on the carrier element. This characterization is intended to indicate that the cams are the cams of, for example, a valve, which cams each produce a different opening behavior of the valve, and which are brought into contact with the valve by the axial displacement of the carrier segments.

In one embodiment, a "set" of different cams is included for each valve of the engine which is actuated by the camshaft. In one variant, the initial cam and the alternative cam or alternative cams are individual cams. In another alternative variant, the cams are segments of a one-piece cam element which has different cam profiles in different segments. In one embodiment, a cam or an alternative cam is constructed in such a manner that the cam causes a cylinder to shut down.

In another embodiment, the initial corn and the alternative cam are both arranged on one of the at least two carrier segments. Thus, in this embodiment the initial cam and the alternative cam are disposed on the same carrier segment.

In still another embodiment, the initial cam and the alternative cam are each arranged on a respective one of the at least two carrier segments. Thus, in this embodiment the initial cam and the alternative cam are disposed on different carrier segments, but preferably on carrier segments arranged adjacent to each other.

In a further embodiment, the initial cam and the alternative cam differ from each other with respect to their geometry and/or with respect to the radial orientation thereof on the carrier element. Thus, by means of the axial displacement of the carrier segments, different cams can be moved axially and brought into engagement with the valves. Thus, in one embodiment, the configuration includes different cams and alternative cams for individual cylinders or groups of cylinders, whereby each of these cams produces a different closing behavior of the cylinders. The cams are thereby brought into functional engagement with their respective cylinders by relative displacement of the carrier segments on which the initial cams and/or alternative cams are disposed. By way of example, it is possible in this case to only displace selected carrier segments, and to change the cams situated on the same with respect to their cylinders.

According to the invention, it is not necessary for all cylinders to be controlled in the same manner. Rather, they can be controlled individually or in groups thereof. Thus, for example, it is possible to shut down cylinders or groups of cylinders. One advantage is that the camshaft according to the invention enables the adjustment of individual cams and/or groups of cams.

In a still further embodiment, only a single carrier element is provided, which is comprised of at least two carrier segments. In this embodiment, the cams are thus carried by a single carrier element, i.e. by only a single shaft. This is in contrast to the prior art, in which shafts-in-shafts are known which mostly are required for the purpose of increasing stability.

BRIEF DESCRIPTION OF THE DRAWINGS

The invention will be described in further detail hereinafter with reference to illustrative embodiments depicted in the accompanying drawing figures, in which.

DETAILED DESCRIPTION OF EMBODIMENTS

Figure 1:
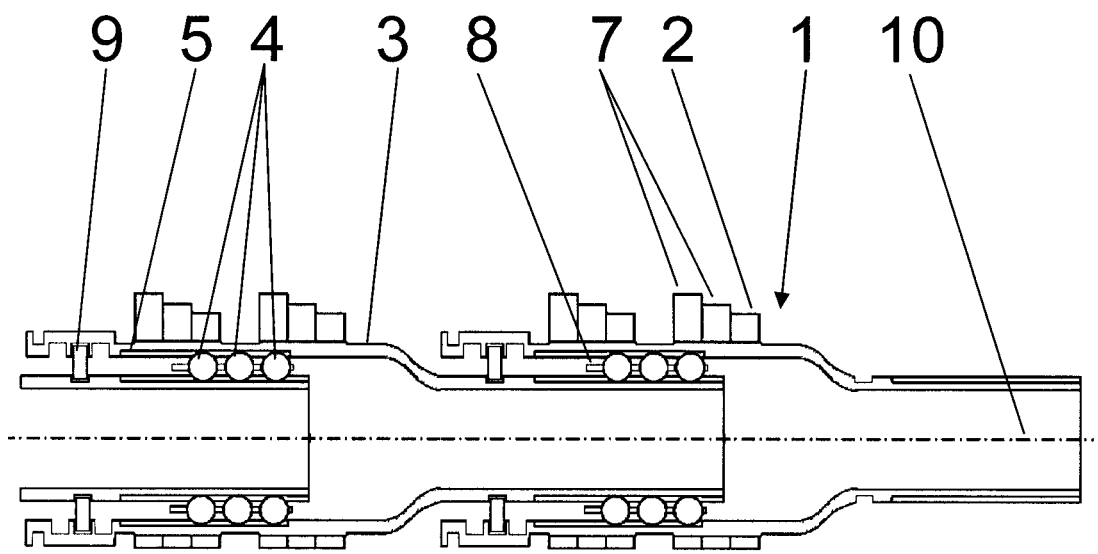
FIG. 1 shows a cutaway view of a camshaft according to the invention.

FIG. 1 shows a cutaway view of a camshaft according to the invention. It is comprised of a carrier element 1, a so-called shaft, which in this case is constructed substantially as a hollow tube, and the individual cams 2. The illustration indicates the longitudinal axis 10 about which the camshaft rotates when in the installed position. The carrier element 1 is comprised of a plurality of carrier segments 3, whereby the carrier segments are partially inserted into each other.

In an alternative embodiment, the carrier elements 3 are constructed in such a manner and are connected to each other such that the carrier element 1 has a substantially equal outer diameter along the length thereof.

Rolling elements 4 are disposed in a ball cage 8 between two concentrically arranged carrier segments 3 in each case. Via these rolling elements 4, the carrier segments 3 can be displaced axially along the longitudinal axis 10 towards or away from each other. In the illustrated embodiment, ball cage 8 holds the rolling elements 4 in one plane and spaced at an adequate distance from each other.

By way of example, in this embodiment two groups of three cams are shown in this case on each of the carrier segments 3. These cams are hereby identified as the cam 2 and the alternative cam 7. However, this only serves to explain the illustration. The essential feature is that each of the differently constructed and/or differently oriented cams are arranged at different axial positions.

These cams can be, as in this case, grouped on each carrier segment 3 or distributed over multiple carrier segments 3. In the operation thereof, the carrier segments 3 are moved from the inside or from the outside in the axial dimension by an appropriate mechanism—for example hydraulically, by gripping elements, or electromagnetically—such that different cams control the valves in each position. The carrier segments 3 in this case are acially displaced either together or individually, and can each be fixed in a position relative to each other along the axial dimension temporarily by a fixing device 9. The fixing devices 9 in the example shown here engage, on the one hand, with a groove of the carrier segment arranged inside, and on the other hand in one of the—in this case—three grooves of the outer carrier segment, independently of the displacement of the carrier segments relative to each other. The fixing device 9 in this case may, for example, be a spring element which can be operated via an appropriate mechanism—for example mechanically, magnetically, etc.—displacing a ball or any other element, for example. The fixing devices 9 can particularly be operated by a control unit, which is not shown here.

To facilitate quick adjustment of the individual carrier segments 3, additional stops may optionally also be included against which the axial displacement takes place.

In one embodiment, for the purpose of displacing individual carrier segments 3, at least two fixing devices 9 and/or the controllers thereof are functionally coupled to each other for controlling the axial displacement. A depression can also be seen on the respective ends of each of the individual carrier segments 3, through which the carrier element 1 is mounted, for example.

Figure 2:
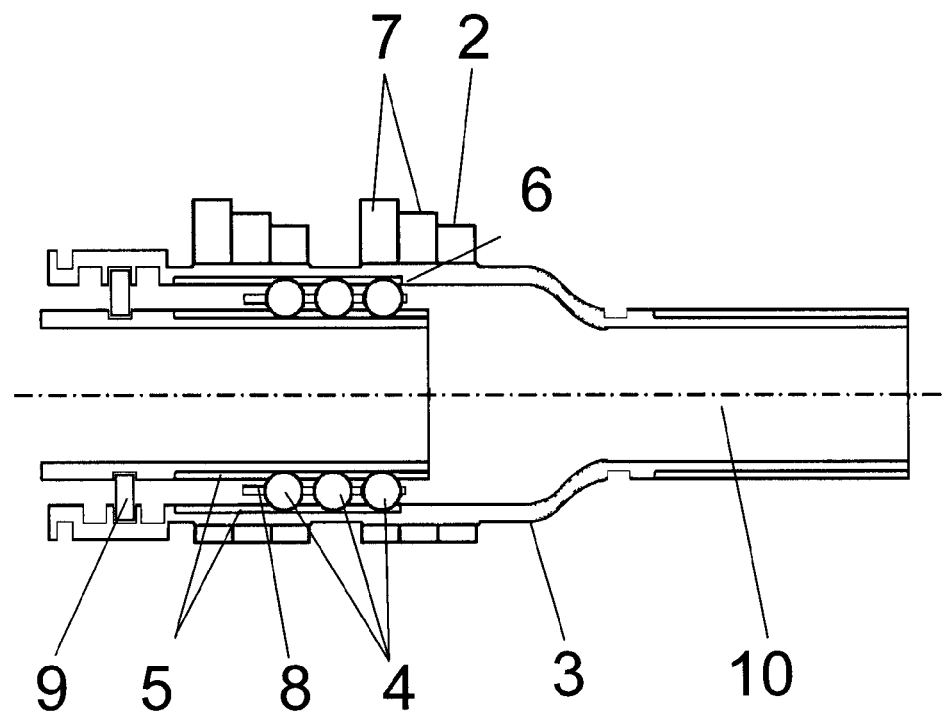
FIG. 2 shows an enlarged section of the camshaft in FIG. 1.

FIG. 2 shows a sectional view of the embodiment of FIG. 1. The carrier segments 3 are each hollow and have a substantially cylindrical construction. They comprise a widened region in which they overlap with each other and in which the rolling elements 4 are arranged.

On the inner side thereof, the carrier segment 3 has a guide groove 5 in the widened region with a larger diameter. This guide groove 5 extends axially along the longitudinal axis 10 as, for example, a ball race. Axially adjoining the widened region is a region having a smaller outer diameter.

The cams 2 and the alternative cams 7 in this variant are attached on the region having the larger outer diameter, for example via an interference fit assembly, a positive fit connection, or a welded, soldered, or adhesive connection, or via a widening of the carrier element 1.

Alternatively, the cams 2 and the alternative cams 7 can be disposed on the region having the smaller outer diameter. The end of the guide groove 5 of each of the respective outer carrier segments 3 functions in this case as the limit stop 6 for the rolling elements 4, and therefore also functions as a stop for the axial displacement of the carrier segments 3 relative to each other. Only two pairs of guide grooves 5 can be seen here. Additional pairs are preferably arranged symmetrically around the carrier segment 3.

In a further embodiment, the cams 2, 7 are partially arranged on the widened region and partially arranged on the region having a smaller diameter.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A camshaft comprising at least one carrier element, at least one cam, and at least one alternative cam, wherein:
   the carrier element comprises at least two carrier segments arranged along a longitudinal axis substantially axially one behind the other and at least one rolling element,
   said at least one cam and said at least one alternative cam are arranged on one of said at least two carrier segments, one of the at least two carrier segments is at least partially arranged inside another of the at least two carrier segments, the at least two carrier segments are constructed and fitted to each other and are connected to each other such that the at least two carrier segments are axially displaceable relative to each other along the longitudinal axis, one of the at least two carrier segments has a guide groove on an inner side thereof extending along the longitudinal axis for the at least one rolling element, the other of the at least two carrier segments has at least one guide groove on an outer side thereof matching the guide grove on said one of the at least two carrier segments and extending along the longitudinal axis for the at least one rolling element, and the at least one rolling element is constructed in such a manner and is arranged between the at least two carrier segments such that the at least two carrier segments are axially displaceable relative to each other via said at least one rolling element.

2. A camshaft according to claim 1, comprising multiple rolling elements and further comprising at least one ball cage for holding said multiple rolling elements.

3. A camshaft according to claim 1, wherein at least one of said at least two carrier segments is provided with a limit stop on an inner or outer side thereof.

4. A camshaft according to claim 1, wherein said at least one cam and said at least one alternative cam have respective geometries which differ from each other.

5. A camshaft according to claim 1, wherein said at least one cam and said at least one alternative cam differ in radial orientation on the carrier element with respect to each other.

6. A camshaft according to claim 1, comprising at least two cams and at least two alternative cams, wherein on each of said at least two carrier segments are arranged one of said two cams and one of said two alternative cams.

* * * * *